United States Patent
Kadle et al.

(10) Patent No.: US 7,621,135 B2
(45) Date of Patent: Nov. 24, 2009

(54) DIFFERENTIAL THERMAL CONDITIONING OF A VEHICLE SEAT

(75) Inventors: Prasad Shripad Kadle, Williamsville, NY (US); Edward Wolfe, IV, Amherst, NY (US); Xiaoxia Mu, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 184 days.

(21) Appl. No.: 11/376,586

(22) Filed: Mar. 15, 2006

(65) Prior Publication Data
US 2007/0214800 A1    Sep. 20, 2007

(51) Int. Cl.
F25B 21/02    (2006.01)

(52) U.S. Cl. .............................. 62/3.3; 62/261; 454/120

(58) Field of Classification Search ............ 62/3.2, 62/3.3, 304, 3.5, 3.61, 3.7, 259.3, 314, 414, 62/419, 261; 454/120
See application file for complete search history.

(56) References Cited

U.S. PATENT DOCUMENTS

| | | | | |
|---|---|---|---|---|
| 4,923,248 A | * | 5/1990 | Feher ..................... 297/180.11 |
| 5,138,851 A | * | 8/1992 | Mardikian .................... 62/244 |
| 5,524,439 A | * | 6/1996 | Gallup et al. .................. 62/3.5 |
| 5,626,021 A | * | 5/1997 | Karunasiri et al. ............ 62/3.5 |
| 5,918,930 A | | 7/1999 | Kawai |
| 6,062,641 A | * | 5/2000 | Suzuki et al. ............ 297/180.1 |
| 6,106,058 A | * | 8/2000 | Sur et al. ............... 297/188.19 |
| 6,276,753 B1 | * | 8/2001 | Sur et al. ............... 297/188.19 |
| 6,474,072 B2 | * | 11/2002 | Needham ....................... 62/3.2 |
| RE38,128 E | | 6/2003 | Gallup |
| 6,928,829 B2 | * | 8/2005 | Kamiya et al. ................ 62/244 |

FOREIGN PATENT DOCUMENTS

JP    2002-301931 A    * 10/2002

* cited by examiner

*Primary Examiner*—Mohammad M Ali
(74) *Attorney, Agent, or Firm*—Patrick M. Griffin

(57) ABSTRACT

Differential thermal conditioning of vehicle seat zones is achieved with convenient adjustment of a seat temperature differential for optimizing the thermal comfort of the seat occupant. Two or more thermoelectric units supply conditioned air to different zones of the seat, and the temperature differential between specified zones of the seat is set by an occupant-adjustable control input.

3 Claims, 5 Drawing Sheets

DIFFERENTIAL THERMAL CONDITIONING OF A VEHICLE SEAT

TECHNICAL FIELD

The present invention relates to thermal conditioning of a vehicle seat, and more particularly to a method and apparatus for providing differential thermal conditioning of the seat for optimal occupant comfort.

BACKGROUND OF THE INVENTION

Occupant comfort in a motor vehicle can be enhanced by regulating the temperature of the seating surfaces in the passenger compartment. For example, the U.S. Pat. No. 5,918,930 discloses a system in which thermally conditioned air discharged from the vehicle's heating, ventilation and air conditioning (HVAC) system is routed through passages in the vehicle seats. And the U.S. Pat. No. 38,128 discloses a system in which Peltier thermoelectric (TE) devices selectively heat or cool cabin air for delivery to seat passages. Alternately, the TE devices can be configured to receive air discharged from the HVAC system for improved transient control of seat temperature.

Physiological modeling of occupant comfort considerations reveals that optimal comfort typically requires more cooling in certain areas of the seat than in others. Specifically, most occupants prefer less cooling (or more heating) of the lower portion of the seat back than the upper portion of the seat back or the seat bottom. And yet, there is enough person-to-person variability to rule out a fixed or factory-calibrated approach.

SUMMARY OF THE INVENTION

The present invention provides an improved method and apparatus for achieving differential thermal conditioning a vehicle seat with convenient adjustment of a seat temperature differential for optimizing the thermal comfort of the seat occupant. Two or more TE units supply thermally conditioned air to different zones of the seat, and the temperature differential between specified zones is set by an occupant-adjustable control input.

DESCRIPTION OF THE PREFERRED EMBODIMENT

Figure 1:
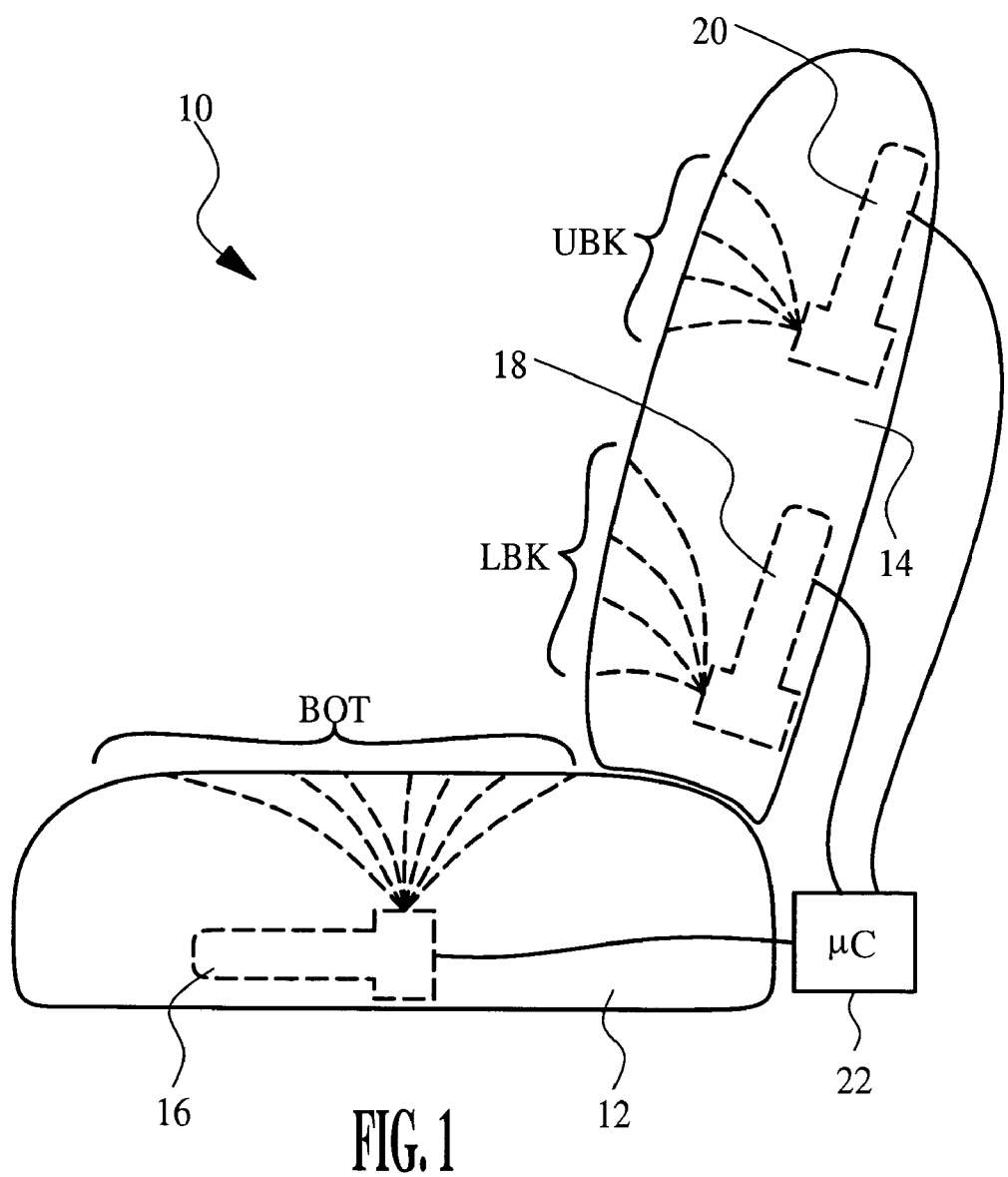
FIG. 1 is a diagram of a vehicle seat equipped with three TE units according to a first embodiment of the present invention.

Referring to FIG. 1, the reference numeral 10 generally designates a vehicle seat including a bottom cushion 12, a back cushion 14, and three TE thermal air conditioning units 16, 18 and 20 for delivering thermally conditioned air to each of three different seat zones via air passages within the cushions 12 and 14. A first seat zone, designated herein as bottom or BOT, comprises the entire seating surface of the bottom cushion 12. A second seat zone, designated herein as lower back or LBK, comprises the lower third or so of the seating surface of back cushion 14. And the third seat zone, designated herein as upper-back or UBK, comprises the upper two-thirds or so of the seating surface of back cushion 14. The TE units 16, 18, 20 are individually activated by a microcontroller (µC) 22 for individual thermal regulation of the three seat zones.

Figure 2:
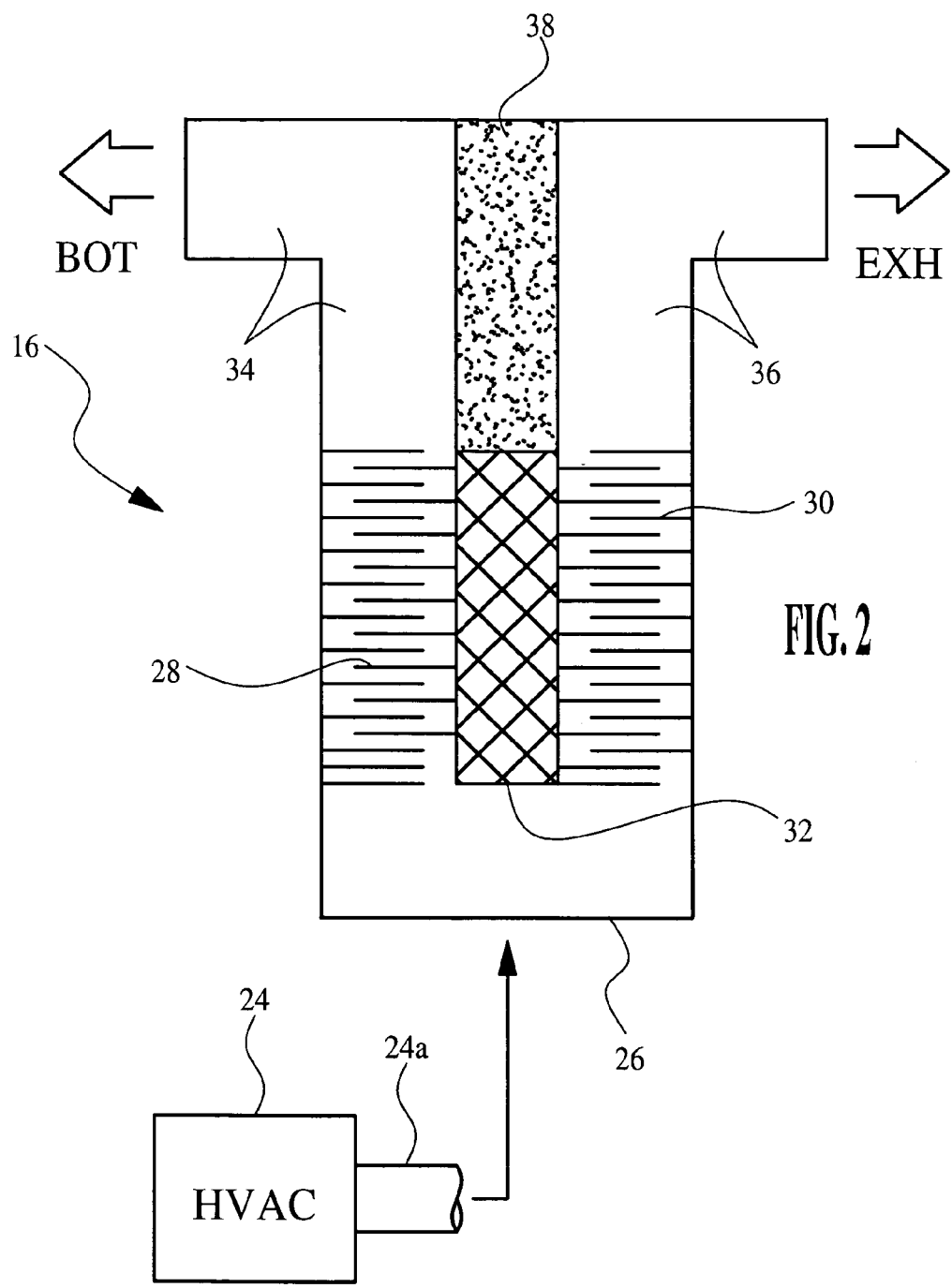
FIG. 2 is a diagram of a TE unit of FIG. 1.

FIG. 2 illustrates the TE unit 16 of FIG. 1, it being understood that the TE units 18 and 20 are essentially identical to TE unit 16. Inlet air supplied to an inlet port 26 passes either through a first heat exchanger 28 or a second heat exchanger 30. A Peltier TE device 32 is disposed between the heat exchangers 28 and 30 so that when electrical current is supplied to TE device 32, one heat exchanger is cooled while the other is heated. A heating mode is established by supplying current of a first polarity (direction) to TE device 32 to heat the heat exchanger 28 and cool the heat exchanger 30; a cooling mode is established by supplying current of a second polarity (direction) to TE device 32 to cool the heat exchanger 28 and heat the heat exchanger 30. Inlet air passing through heat exchanger 28 is supplied to the BOT seat zone via air duct 34, while inlet air passing through heat exchanger 30 is exhausted into the cabin space adjacent seat 10 via exhaust duct 36. A thermal insulator 38 disposed between the ducts 34 and 36 downstream of the TE device 32 inhibits the transfer of thermal energy between the ducts 34 and 36. The inlet air for TE unit 16 is preferably obtained from an air discharge outlet 24a of the vehicle HVAC system 24 as shown in FIG. 1. Alternatively, the inlet air may be obtained directly from the vehicle cabin and forced through TE unit 16 with a motor-driven blower, for example.

As explained below, the microcontroller 22 determines the optimum temperatures for the various seat zones, and then individually activates the TE units 16, 18 and 20 to deliver suitably conditioned air to the respective seat zones. In this way, the microcomputer can achieve differential thermal regulation of seat 10. As mentioned above, both physiological modeling and actual testing have shown that optimal comfort of a seat occupant is most frequently achieved when the LBK seat zone is warmer than the UBK and BOT seat zones. However, the magnitude of the temperature differential varies depending on factors such as the occupant's personal preference and the thermal conductance of the occupant's clothing. The present invention addresses this variability by establishing an occupant-adjustable setting corresponding to the desired seat temperature differential.

The highest degree of flexibility can be achieved by allowing the seat occupant to select a desired temperature for each seat zone or perhaps temperature differentials between certain seat zones. While such an implementation is certainly within the scope of the present invention, the preferred approach is to thermally condition the BOT and UBK seat zones according to a first desired temperature and to thermally condition the LBK seat zone to a second desired temperature that is variably higher than the first desired temperature.

Figure 3:
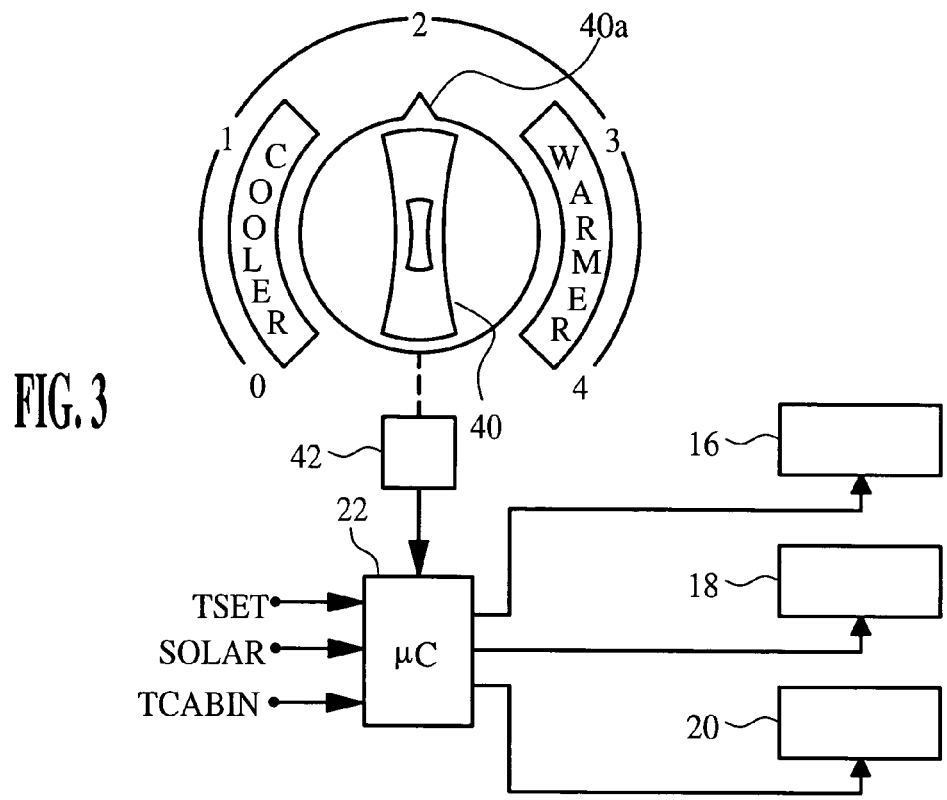
FIG. 3 is a diagram of a system including the TE units of FIG. 1, an occupant-adjustable control input, and a microcontroller for activating the TE units in accordance with this invention.

FIG. 3 illustrates the preferred approach as applied to the embodiment of FIG. 1 where an individual TE unit 16, 18 or 20 is dedicated to each seat zone. Thus, the TE units 16 and 20 thermally condition the BOT and UBK seat zones based on a first desired temperature, and the TE unit 18 thermally conditions the LBK seat zone based on a second desired temperature that is variably higher than the first desired temperature.

Figure 4:
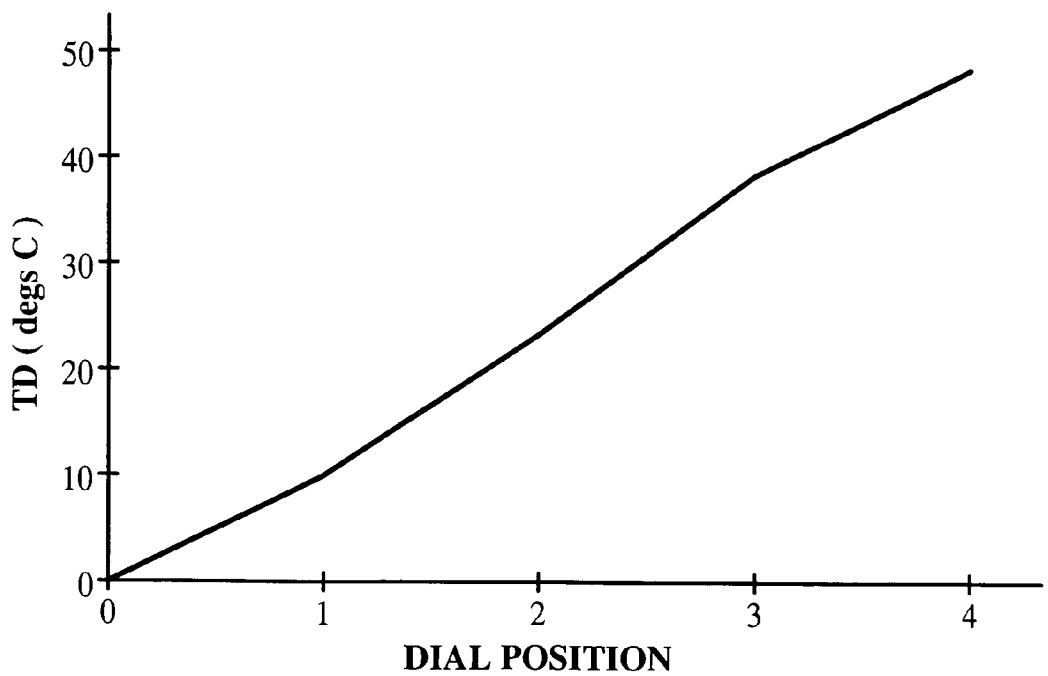
FIG. 4 is a graph illustrating desired seat zone differential temperature vs. position for the occupant-adjustable control input of FIG. 3.

The differential between the first and second desired temperatures may be adjusted by occupant manipulation of a control input such as an instrument panel dial 40. In the configuration of FIG. 3, the dial 40 has a pointer 40a and is rotated define a range of settings between zero (for minimum temperature differential) and four (for maximum temperature differential). The graph of FIG. 4 depicts a possible relationship between dial position and the corresponding temperature differential TD. The rotary position of dial 40 is detected for microcontroller 22 by a transducer 42 such as a potentiometer, and the microcontroller 22 suitably activates the TE units 16, 18 and 20 based on the transducer output and other parameters such as solar loading (SOLAR), the set temperature (TSET) of HVAC system 24 and the actual cabin air temperature (TCABIN). Optionally, a relative humidity sensor may be used as well. For any given combination of the SOLAR, TSET and TCABIN, microcontroller 22 determines a first desired temperature for the BOT and UBK seat zones, and then uses the first desired temperature and the output of transducer 42 to determine a second desired temperature for the LBK seat zone. The microcontroller 22 controls the polarity and magnitude of current supplied to each of the TE units to achieve the desired temperatures for the various seat zones. The temperature regulation can be either open-loop as implied in FIG. 3, or closed-loop with seat temperature feedback provided to microcontroller 22.

Optionally, the rotary dial 40 of FIG. 3 may additionally be axially displaceable for occupant selection of seat conditioning mode. For example, the dial 40 may be axially depressed to engage a limited function "LBK-Only" mode where thermal air conditioning is only active for the LBK seat zone. In this case, transducers could be used to measure the temperatures of the UBK and BOT seat zones, and the microcontroller 22 would determine a desired temperature for the LBK zone based on the measured temperatures and the rotary position of dial 40. Additionally or alternatively, axial displacement of the dial 40 can be used to disable thermal conditioning of the seat if desired.

Figure 5:
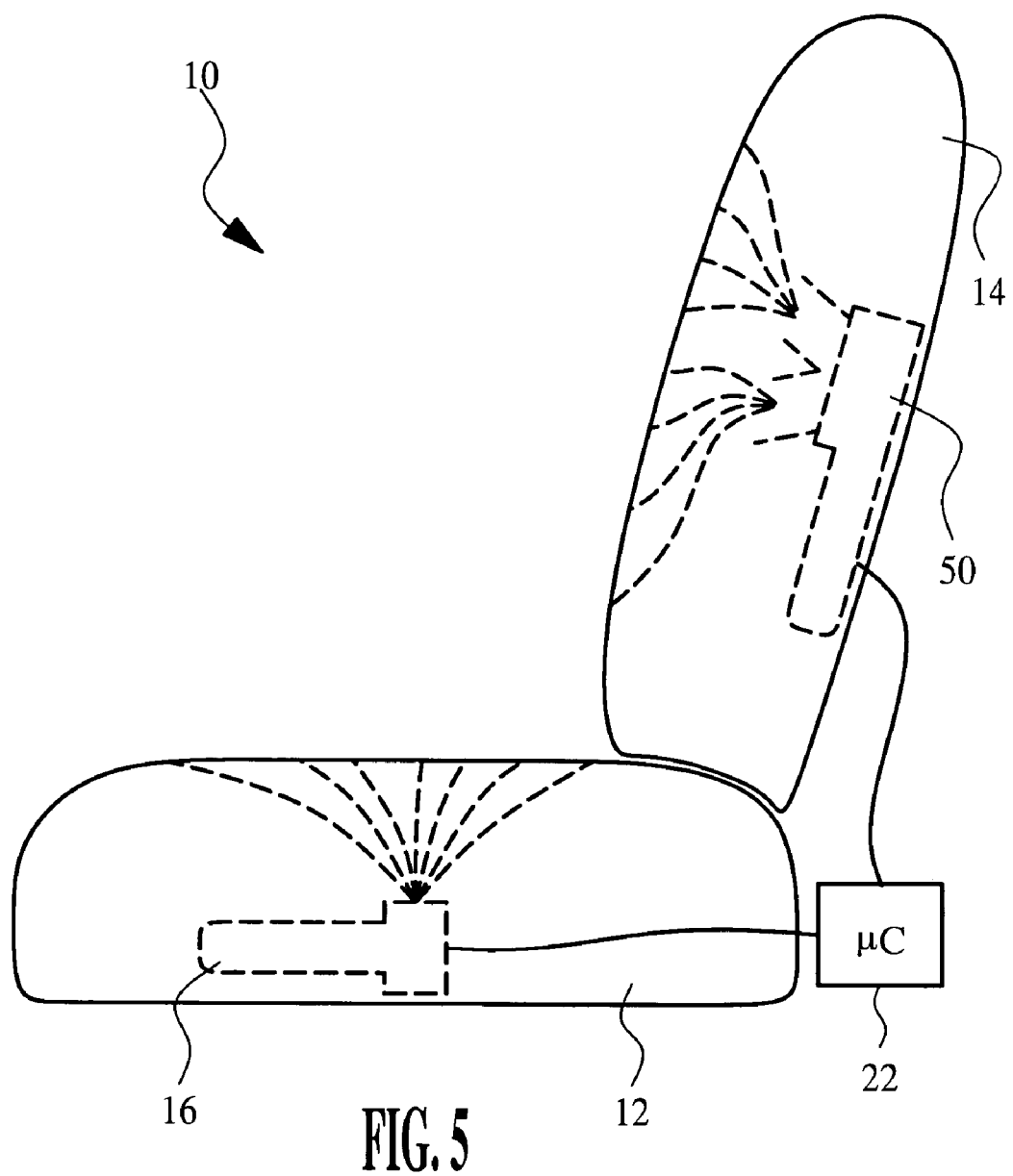
FIG. 5 depicts a vehicle seat equipped with two TE units according to a second embodiment of this invention.
Figure 6:
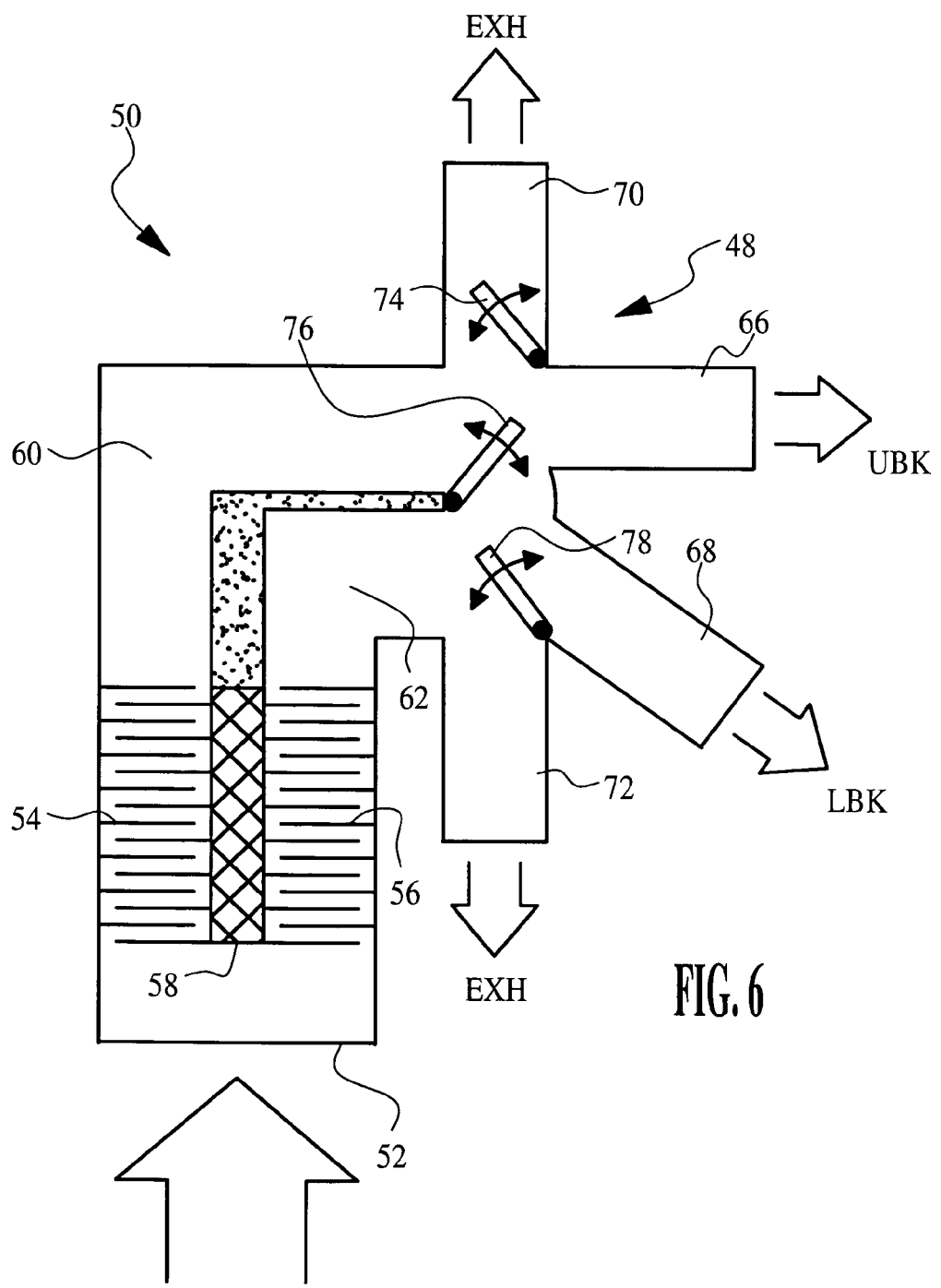
FIG. 6 is a diagram of the seat back TE unit of FIG. 5.

FIGS. 5-6 depict an alternate embodiment in which an air valve apparatus 48 enables a single TE unit 50 to deliver conditioned air to both the UBK and LBK seat zones. Referring particularly to FIG. 6, the TE unit 50 is like the TE units 16, 18, 20 in that it includes an inlet port 52 for receiving inlet air (from HVAC system 24 or directly from the vehicle cabin), a pair of heat exchangers 54 and 56 disposed on opposite sides of a Peltier TE device 58, and thermally insulated ducts 60 and 62 downstream of the TE device 58. As with the TE units 16, 18, 20, the TE device 58 produces warmed air in one of the ducts 60, 62 and cooled air in the other duct 62, 60, depending on whether it is operated in a heating mode or a cooling mode. Only here, the airflow in either of the ducts 60, 62 is not necessarily exhausted. Instead, the air valve apparatus 48 selectively directs the airflows from ducts 60 and 62 to the UBK and LBK seat zones via ducts 66 and 68 or to the cabin space near seat 10 via exhaust ducts 70 and 72. Preferably, microcontroller 22 controls the airflow by using servomotors to suitably position air control doors 74, 76, 78 that are individually rotatable about respective pivot points.

Microcontroller 22 achieves the desired temperatures for the LBK and UBK seat zones by controlling the mode and power of TE device 58 while suitably configuring air valve apparatus 48. Advantageously, the air cooled by TE unit 50 can be supplied to the UBK seat zone while the air heated by TE unit 50 is supplied to the LBK seat zone. For example, microcontroller 22 can activate TE device 58 cool the air passing through duct 60 and warm the air passing through duct 62 while positioning air control door 76 intermediate the UBK and LBK ducts 66 and 68. In this case, the air control doors 74 and 78 can be positioned to partially or fully close the exhaust ducts 70 and 72. The TE power can be regulated to provide the desired amount of cooling for the UBK seat zone, and the desired temperature differential between the UBK and LBK seat zones can be achieved by positioning air control door 78 relative to exhaust duct 72 to control how much of the warmed air in duct 62 is actually delivered to the LBK duct 68. It is also possible in this situation to position air control door 76 so that a portion of the cooled air in duct 60 is delivered to the LBK duct 68. If the limited "LBK-Only" mode is engaged, the air control door 74 can be positioned to direct the cooled air in duct 60 to the exhaust duct 70. It will thus be seen that by controlling both the TE device activation and the air control doors 74, 76, 78 of air valve apparatus 48, microcontroller 22 can achieve virtually any thermal conditioning of the UBK and LBK seat zones that might be desired by the seat occupant.

In summary, the present invention provides an easily implemented method and apparatus for optimizing the thermal comfort of a seat occupant through differential thermal conditioning. While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. An apparatus for delivering thermally conditioned air to a seat back of a vehicle seat, comprising:
    a thermal thermoelectric unit conditioning air supplied to an upper back seat zone defined by an upper portion of said seat back and a lower back seat zone defined by a lower portion of said seat back, wherein said thermoelectric unit includes a first outlet duct in hydraulic communication with said upper portion of said seat back and a second outlet duct in hydraulic communication with said lower portion of said seat back; and
    an air valve apparatus for apportioning conditioned air from said thermoelectric unit among said first outlet duct and said second outlet duct, wherein said air valve apparatus includes a first air control door between said first and second outlet ducts for apportioning conditioned air among said upper back seat zone and said lower back seat zone, a second air control door for selectively exhausting air from a passage coupling said thermoelectric unit to said upper back seat zone, and a third air control door for selectively exhausting air from a passage coupling said thermoelectric unit to said lower back seat zone.

2. The apparatus of claim 1, further comprising:
    an occupant-adjustable control input; and
    a controller for activating said thermoelectric unit and said air valve apparatus for delivering air to said lower back zone and said upper back zone such that air is delivered to said upper back seat zone at a first temperature, and to said lower back seat zone said at a second temperature, where the second temperature exceeds the first temperature, and said control input is used to establish an amount by which the second temperature exceeds the first temperature.

3. The apparatus of claim 2, wherein at least one of said air control doors is rotatable about a pivot point and includes a servomotor to rotate said air control door about said pivot point.

* * * * *